US007600438B2

(12) United States Patent
Sandoz et al.

(10) Patent No.: US 7,600,438 B2
(45) Date of Patent: Oct. 13, 2009

(54) DEVICE AND METHOD FOR THE ADJUSTMENT OF A TEMPERATURE OF A LIQUID

(75) Inventors: Roger Sandoz, Rotkreuz (CH); Frank Ulrich Schubert, München (DE); Hans-Rudolf Bachmann, Buttikon (CH); Renato Baumann, Steinhausen (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 241 days.

(21) Appl. No.: 11/226,818

(22) Filed: Sep. 13, 2005

(65) Prior Publication Data

US 2006/0075835 A1 Apr. 13, 2006

(30) Foreign Application Priority Data

Sep. 30, 2004 (EP) ................................ 04023309
Aug. 12, 2005 (EP) ................................ 05017580

(51) Int. Cl.
*G01N 1/10* (2006.01)

(52) U.S. Cl. ................................ 73/863.12; 73/863.11

(58) Field of Classification Search .................. 73/866, 73/863.11–863.12
See application file for complete search history.

(56) References Cited

U.S. PATENT DOCUMENTS 5,721,123 A 2/1998 Hayes et al. ............... 435/91.1
6,506,360 B1 * 1/2003 Andersen et al. ............ 423/657
2003/0236633 A1 12/2003 Mei et al. ..................... 702/20

FOREIGN PATENT DOCUMENTS

JP 63108725 A * 5/1988
JP 07258771 A * 10/1995
WO WO 96/41864 12/1996
WO WO 98/08978 3/1998

* cited by examiner

*Primary Examiner*—Hezron Williams
*Assistant Examiner*—Nashmiya S Fayyaz
(74) *Attorney, Agent, or Firm*—Charles M Doyle; Olga Kay

(57) ABSTRACT

A device and a method for the adjustment of a temperature of a liquid which is contained in one or more sample vessels are specified, a control unit and a temperature adjustment unit being provided, which acts on the liquid contained in the sample vessels. Furthermore, the control unit is operatively connected to the temperature adjustment unit. The liquid to be analyzed contains absorption elements in order to accelerate the temperature adjustment in the liquid to be analyzed.

19 Claims, 4 Drawing Sheets

DEVICE AND METHOD FOR THE ADJUSTMENT OF A TEMPERATURE OF A LIQUID

This application claims the benefit of priority under 35 U.S.C. §119 of EP Application 04023309.0, filed Sep. 30, 2004 and EP Application No. 05017580.1, filed on Aug. 12, 2005, the contents of which are hereby incorporated by reference.

BACKGROUND OF THE INVENTION

1. Field of the Invention

The present invention is related to a device for the adjustment of a temperature of a liquid and a corresponding method.

2. Description of Related Art

It is generally known that chemical analysis of samples and chemical/physical processes must be performed at a predetermined temperature in order to obtain accurate results. In particular for a high number of chemical analysis within a relatively short period of time, or for processes in which a temperature or different temperatures must be adjusted, powerful and cost intensive temperature adjustment units are required in order that these demands can be met.

Different devices and methods for the adjustment of the temperature are known. It is referred representatively to the following documents: DE-42 03 202 A1, EP-0 160 282 B1, EP-0 318 255 A2, WO 98/38487, U.S. Pat. No. 6,210,882 und EP-0 345 882 A1.

The known teachings can basically be divided in two groups. The so-called solid body incubators belong to the first group, for which the samples are heated or cooled by the solid body, for which a corresponding amount of time is needed depending on the heat capacity. If the temperature of liquid samples must be adjusted, one ore more of the following problems occur:

- Large thermal masses must also be heated or cooled for a temperature change;
- Diffusion limitations occur between a heated sample vessel wall and the liquid (boundary layer creation);
- A direct contact between the heat source and the heat sink, respectively, and the sample vessels to be heated is required; a bad contacting between temperature adjustment unit and sample vessel results in a considerable delay for the temperature adjustment;
- Contacting by sensor cables act as heat sinks and result in additional losses.

Temperature adjustment units which are based on a radiation, in particular on an IR-(infrared)-radiation, belong to the second group. An improved behavior can indeed be confirmed compared to the first group but also for this second group a number of disadvantages to be taken into account occur, which disadvantages result in a suboptimal heating behavior for liquids:

- Non optimized absorption spectra of the reaction compounds to be heated;
- Non optimized transmission spectra of the sample vessels;
- Other system elements are unintentionally heated by the IR-radiation.

SUMMARY OF THE INVENTION

Therefore, the present invention is based on the object to specify a device for the adjustment of a temperature of a liquid, the device not having one or more of the above-mentioned disadvantages.

In one embodiment, the invention provides a device for the adjustment of a temperature of a liquid which is contained in a sample vessel, the device comprising a control unit and a temperature adjustment unit effective to act on the liquid contained in the sample vessel, the control unit being operatively connected to the temperature adjustment unit, wherein the liquid to be analyzed contains heat absorption elements in order to accelerate the temperature adjustment in the liquid to be analyzed, the absorption elements having a heat conductivity that is greater than 0.6 W/m K.

In another embodiment, the invention provides a method for the adjustment of a temperature of a liquid which is contained in a sample vessel, the method comprising

- adding absorption elements to the liquid, the absorption elements having a heat conductivity that is greater than 0.6 W/m K, and
- irradiating the sample vessel, wherein at least a part of the radiation energy is converted into heat in the absorption elements.

Further advantageous embodiments of the present invention are specified in further claims.

The invention has the following advantages: As the liquid to be analyzed contains absorption elements which have a heat conductivity greater than 0.6 W/m K, the temperature adjustment in the liquid to be analyzed is considerably accelerated. By this, the through put of samples per time unit can be increased accordingly.

DETAILED DESCRIPTION OF THE INVENTION

Figure 1:
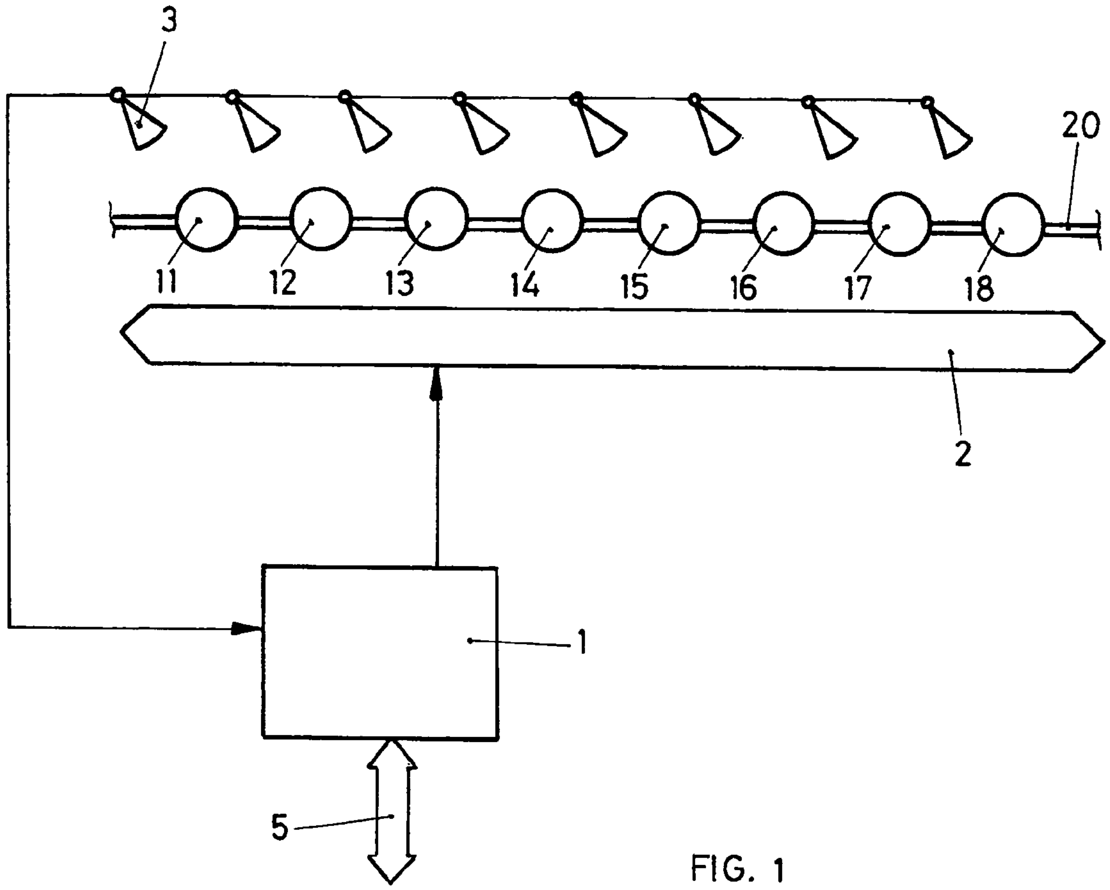
FIG. 1 is a schematic diagram of a device according to the present invention as a so-called linear-IR-incubator.

FIG. 1 shows an embodiment of the present invention in a schematic view in which eight sample vessels 11 to 18 are arranged essentially on one line, a transport unit 20 being provided to hold the sample vessels 11 to 18 in position, on the one hand, and to ensure an easy transport of the sample vessels 11 to 18, on the other hand. Lateral to the sample vessels 11 to 18 or the transport unit 20, a temperature adjustment unit 2 is provided, by means of which the temperature of the liquid present in the sample vessels 11 to 18 can be adjusted. Thereto, a control unit 1 is provided which is operationally connected to the temperature adjustment unit 2, i.e. a control signal is generated in the control unit 1, which control signal results in a corresponding temperature radiation by the temperature adjustment unit 2.

In one embodiment of the invention, the control unit 1 receives no feedback about the temperature generated in the sample vessels 11 to 18.

In a further embodiment of the present invention, as shown in FIG. 1, sensor elements 3 are provided in the area of the sample vessels 11 to 18, with the aid of which the respective temperature of the liquids present in the sample vessels 11 to 18 can be determined. In one embodiment, a sensor element 3 is provided for each sample vessel 11 to 18. In other embodiments, the temperature may be measured in fewer than all of the sample vessels 11 to 18, and it may be assumed that the measured temperature value is equal in all other sample vessels 11 to 18.

The embodiments of the present invention with sensor elements 3 allow the control of the temperature radiation of the temperature adjustment unit 2, so that a desired temperature of the liquids contained in the sample vessels can be set quickly and precisely.

In FIG. 1, a system bus is designated by 5, via which the device according to the present invention can be coupled e.g. to a superior system, which takes over all controls of a process, for example.

It has been found that an IR-(Infrared)-radiation unit is particularly suitable as temperature adjustment unit 2. An IR-radiation unit irradiates the liquid in the sample vessels 11 to 18 within the infrared wave length range. However, other wave length ranges are also conceivable.

In one embodiment, the temperature adjustment unit 2 may be a radiant panel heater (two dimensional) in thick film technology or thin film technology.

In order that the adjustment of the temperature of the liquids contained in the sample vessels 11 to 18 can be performed quicker and more efficiently, it is suggested according to the present invention to add absorption elements to the liquids contained in the sample vessels. The absorption elements thereby have the task to absorb the radiation energy emitted by the temperature adjustment unit 2 and to emit it as heat to the liquids contained in the sample vessels 11 to 18. The choice for an absorption element therefore depends on the temperature adjustment unit 2 or on the wavelength range of the radiation, respectively.

The absorption elements should not chemically influence the liquid to be analyzed or to be processed—i.e. they are inert with regard to the liquid—, and, in addition, shall have, for example, one or more of the following properties:

- High heat conductivity, preferably greater than 0.6 W/m K;
- Low heat capacity, preferably smaller than 4000 J/kg K;
- Magnetized or magnetizeable;
- Low specific density, preferably smaller than 6 g/cm$^3$.

One or more of the following effects can be achieved by the absorption elements according to the present invention:

- Higher efficiency;
- Higher heating speed of the liquids contained in the sample vessels 11 to 18;
- Stronger convection effects within the sample vessels 11 to 18 due to the local heat input at the absorption elements;
- Better homogeneity within the liquid to be heated as a result of the increased convection effect within the sample vessels 11 to 18 (an additional mixing of the liquids is not necessary).

Spherical particles, for example, of a size from 0.1 to 100 μm, in particular from 0.5 to 5 μm, are suitable as absorption elements. These may be glass balls with encapsulated magnetic pigments, for instance of iron oxide. Such absorption elements are referred to as e.g. MGPs (Magnetic Glass Particles). Furthermore, the absorption can be increased by using polymers (PS) for the manufacturing of absorption elements. Finally, the heat conductivity and therewith a heat input into the liquids can be increased by adding absorption elements of other inert particles (for example of aluminum, ceramics or carbon fibers).

Particulate solid bodies, as described e.g. in the known teachings according to WO 96/41 811 (respectively U.S. Pat. No. 6,255,477 B1) or WO 00/32 762 (respectively U.S. Pat. No. 6,545,143 B1) or WO 01/37 291 (respectively US-2003/224 366 A1) of the same applicant are particularly suitable as absorption elements. The disclosures of each of these patents and patent applications is hereby incorporated by reference.

As has already been pointed out, the absorption elements primarily have the task to convert radiation into heat and to emit it into the liquid to be heated in the sample vessel in order to be able to reach a desired temperature of the liquid as quickly as possible. Further embodiments may comprise particles used as absorption elements, at which nucleic acid can be reversibly bound as described in the previously mentioned international patent publication WO 96/41 811. Thereby, the method consists in that nucleic acid is bound to the particles in an isolation step. By this step, an extremely efficient heat transfer can be obtained. The liquid to be analyzed thereby is preferably aqueous, in particular a sample containing nucleic acid, for instance a body fluid or a liquid derived there from.

A further improvement of the efficiency and the heat input into the liquid of the sample vessels 11 to 18 is achieved for the device according to the present invention if the sample vessels 11 to 18 are made of a material with a low heat capacity and/or a reduced absorption. For example, the use of COC (cycloolefin-copolymer) is suitable instead of PP (polypropylene) usually used for sample vessels.

Beside the selection of the suitable material for the sample vessels in order to obtain the above-mentioned properties, a further optimization is possible by suitable properties of the chosen temperature adjustment unit. So, whenever an IR-radiation unit is used its spectrum should be adapted to the material used for the sample vessels 11 to 18. Thus an optimized overall system is obtained.

For the embodiment illustrated in FIG. 1, the introduction of heat into the sample vessels 11 to 18 is performed by the laterally arranged temperature adjustment unit 2. The measurement of the instantaneous temperature by means of the sensor elements 3 is performed preferably, but not mandatory, from above i.e. via the opening in the sample vessels 11 to 18. Thus, a direct measurement of the temperature can be performed and no measurement falsifications due to vessel walls located in between the sensor element 3 and the liquid are to be expected.

Alternatively, the liquid in the sample vessels 11 to 18 can be heated from below or from above. In this case, a temperature measurement from the side is preferred.

Figure 2:
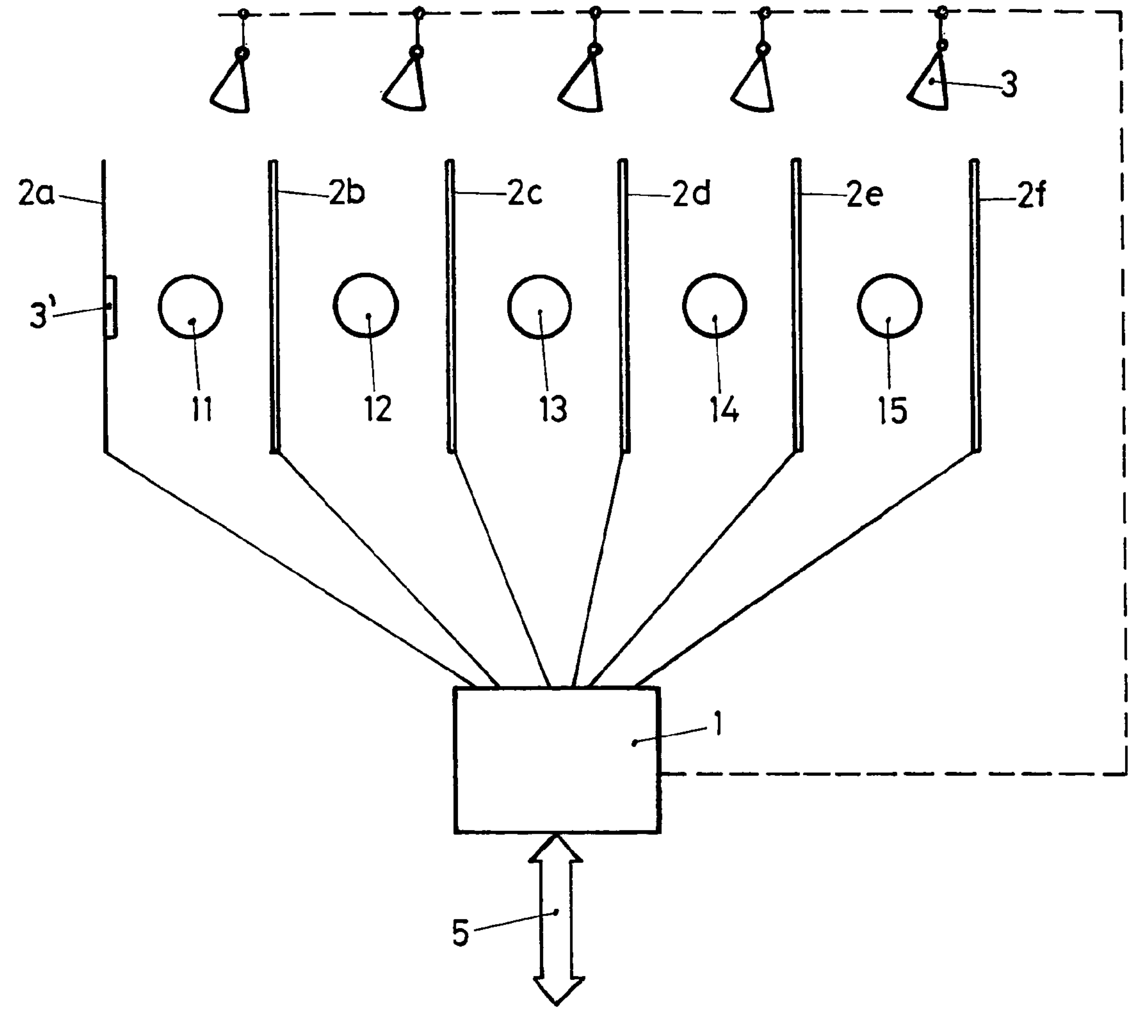
FIG. 2 is a schematic diagram of a device according to the present invention as a linear-IR-Incubator.

FIG. 2 shows a further embodiment of the device according to the present invention with a linear-IR-incubator. Instead of a laterally arranged temperature adjustment unit, as for the embodiment according to FIG. 1, the embodiment according to FIG. 2 comprises a rake-shaped temperature adjustment unit, which consists of the temperature adjustment elements 2*a* to 2*f* substantially arranged in parallel. The temperature adjustment elements 2*a* to 2*f* can also be manufactured by using the mentioned thin-film technologies or thick-film technologies. For this embodiment, the possibility exists to regulate the temperature of the liquids contained in the single sample vessels 11 to 15 individually. Thereto, the control unit 1 is connected to each of the temperature adjustment elements 2*a* to 2*f*.

Like for the embodiment according to FIG. 1, the temperature measurement is performed via sensor elements 3, which are connected to the control unit 1 (represented by a dotted line in FIG. 2). The sensor elements 3 are preferably arranged above or underneath the sample vessels 11 to 15.

In an alternative embodiment, the sensor elements 3' are directly provided on the temperature adjustment elements 2*a* to 2*f*, as it is representatively indicated for the first temperature adjustment element 2*a*.

Figure 3:
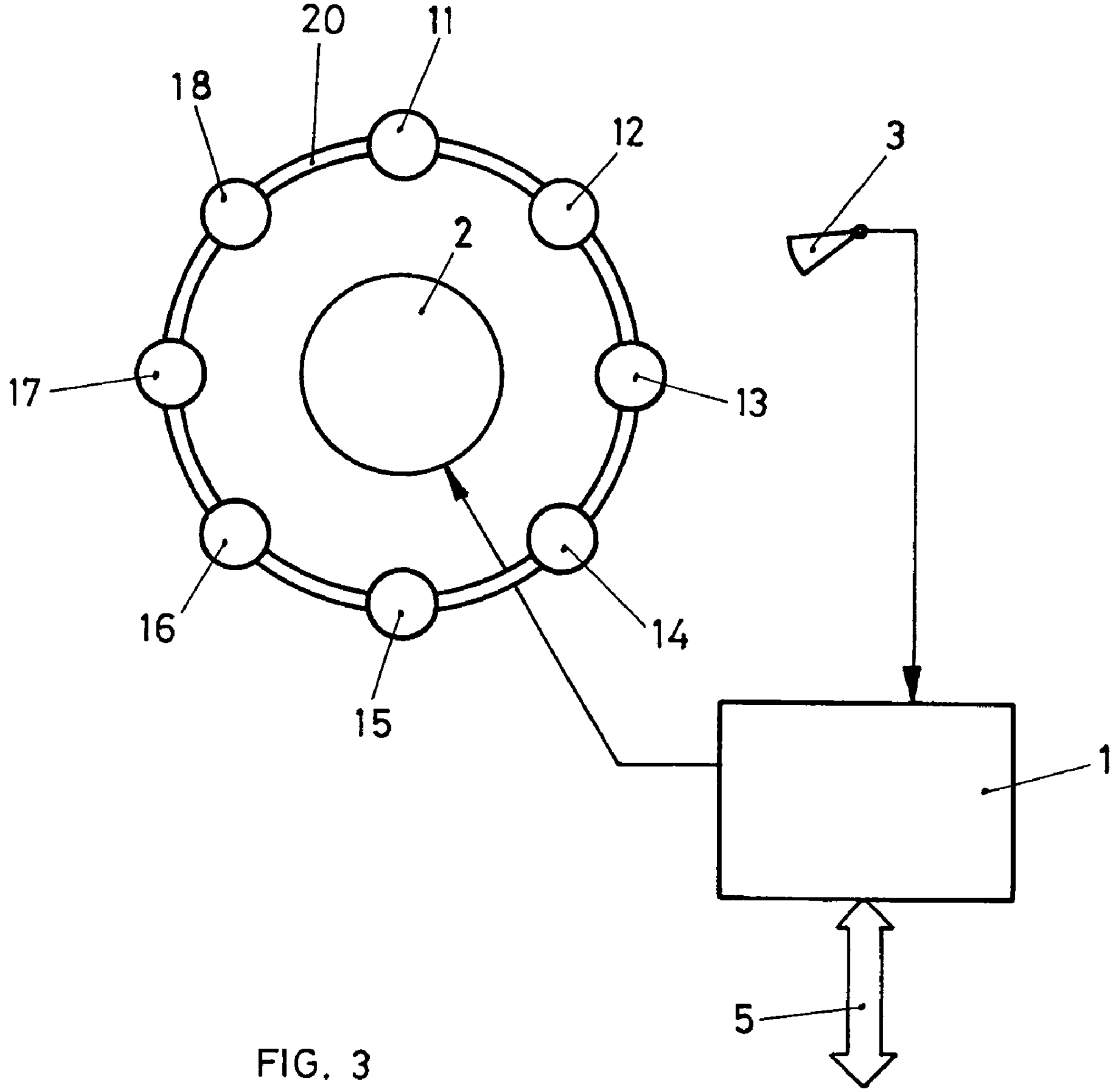
FIG. 3 is a schematic diagram of another embodiment of a device according to the present invention as a so-called rotor-IR-Incubator.

A further embodiment of the device according to the present invention is illustrated in FIG. 3. A so-called rotor- IR-incubator is used in this embodiment, for which rotor-IR-incubator the sample vessels 11 to 18 are arranged on a circle. Accordingly, the sample vessels 11 to 18 are held in position by a circular transport unit 20. The temperature adjustment unit 2 is arranged in the centre of the circular transport unit 20 so that the heat rays are emitted in a radial manner, thereby impinging laterally on the sample vessels 11 to 18. As also shown for the embodiments according to FIGS. 1 and 2, a single or several sensor elements 2 are also provided for the embodiment of FIG. 3 in order to measure the temperature of the liquids contained in the sample vessels 11 to 18. In another embodiment, again similar to the embodiments of FIG. 1 and FIG. 2, the control unit 1 may regulate the temperature via the temperature adjustment unit 2.

In order the sensor units 3 are not affected by heat emitted from the temperature adjustment unit 2, the sensor units 3 must be suitably positioned. For the embodiment of FIG. 3, with a centrally arranged temperature adjustment unit 2, an arrangement of the sensor unit 3 above the sample vessels 11 to 18 is particularly suitable, whereby a direct influence by the temperature adjustment unit 2 is excluded.

Figure 4:
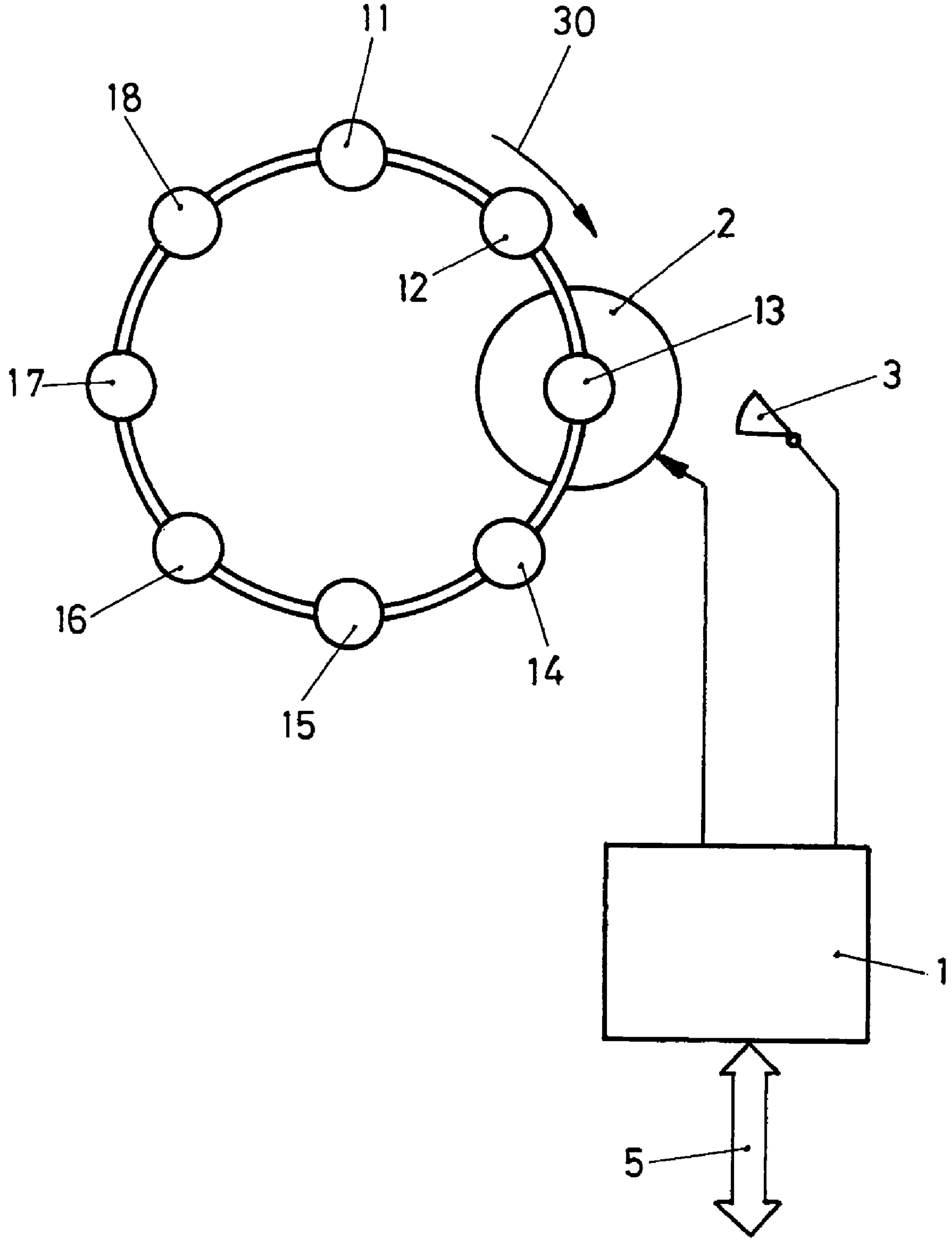
FIG. 4 is a schematic diagram of yet another embodiment of a device according to the present invention as a rotor-IR-Incubator.

FIG. 4 shows a further embodiment of the device according to the present invention with a rotor-IR-incubator. The embodiment of FIG. 4 comprises a temperature adjustment unit 2 arranged underneath one of the sample vessels 11 to 18. In another embodiment according to FIG. 4, a temperature adjustment unit 2 may be arranged underneath several or underneath all sample vessels 11 to 18.

In an arrangement with a single sample vessel containing 100 µl water and 6 mg MGPs and starting from room temperature, a water temperature of 80° Celsius was reached after ca. 40 seconds when using a 90 Watt halogen lamp as temperature adjustment unit. The sample vessel is concentrically arranged above a halogen lamp as the temperature adjustment unit, the halogen lamp being arranged before a rotationally symmetrical mirror. In order to reduce the part of visible rays, a wavelength filter is further arranged between the temperature adjustment unit and the sample vessel. In order to be able to achieve a precise and quick temperature adjustment a contactless temperature sensor is provided to which the control unit and the temperature adjustment unit are operationally connected.

It is explicitly pointed out that a temperature adjustment unit 2, which generates rays in the infrared range, is particularly suitable for all explained embodiments according to the present invention. However, temperature adjustment units are also conceivable which generate rays in other wave length ranges. Whatever wavelength range is chosen, it should correspond to the materials used for the absorption elements and for the sample vessels 11 to 18.

As sample vessels, conventional so-called tubes are suitable, which consist of a cylindrical portion and run out e.g. in a taper towards the closed end.

Alternatively, so-called flat cells are suitable which essentially consist of one or several chambers with a low depth (some hundreds µm) in a carrier material.

It has been found that so-called Eppendorf tubes or other tubes with a capacity of 300 µl to 2.5 ml are suitable. Furthermore, hollow cylinders and capillary tubes are also suitable as sample vessels.

Basically, the capacity of the sample vessels, however they are designed, can amount up to approximately 5 ml. In some embodiments, the capacity of the sample vessels may be in the range from 0.1 to 5 ml. In other embodiments, the capacity of the sample vessels may be in the range from 0.3 to 2.5 ml.

For an alternative embodiment of the sample vessels as flat cells, a depth is selected of e.g. 0.1 to 1 mm. In some embodiments, the capacity of the sample vessels may be from 0.3 to 0.7 mm. The capacity may be in the range from 0.1 to 100 µl, or may be in the range from 0.3 to 50 µl, or may be in the range from 0.5 to 0.9 µl or in the range from 30 to 40 µl.

For a further embodiment of the present invention with flat cells as sample vessels, the cells are Olive-shaped, i.e. a cross-section of a cell is oval with a maximal width of 6 mm and a maximal length of 14 mm, the cell depth being approximately 0.65 mm. Besides an oval cross-section, a circular cross-section is also conceivable. In this case, the cell corresponds to a cylindrical cavity that has a diameter of 1.5 mm, for example, and a height of also 1.5 mm. For these embodiments of a flat cell, the information with regard to the capacity in relation to the above-mentioned flat cells is valid correspondingly.

The present invention may be used, without limitation for the following instruments: incubators, thermocyclers, and other instruments in connection with an energy introduction.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A device for the adjustment of a temperature of a liquid which is contained in one or more sample vessels, the device comprising:

a transport unit effective to hold and transport the sample vessels, magnetic particles added to the liquid in the one or more sample vessels;

one or more temperature sensor elements effective to sense temperature of the liquid in the one or more vessels;

a temperature adjustment unit effective to act on the liquid contained in the one or more sample vessels;

a control unit being operationally connected to the temperature adjustment unit and the one or more temperature sensor elements, wherein the liquid to be analyzed contains said magnetic particles in order to accelerate the temperature adjustment in the liquid to be analyzed, the magnetic particles having a heat conductivity that is greater than 0.6 W/m K.

2. Device according to claim 1, wherein the magnetic particles are substantially inert to the liquid to be analyzed, and have one or more of the following properties:

heat capacity smaller than 4000 J/kg K;

specific density smaller than 6 g/cm$^3$.

3. Device according to claim 1, wherein the magnetic particles comprise at least one of the following materials:

Glass;

Ceramic;

Aluminum; or

Carbon fibers.

4. Device according to claim 1, wherein the magnetic particles contain a magnetic pigment of iron oxide.

5. Device according to claim 1, wherein the material comprising the sample vessels has a smaller absorption capability and/or a smaller heat capacity than the material comprising the magnetic particles.

6. Device according to claim 1, wherein the sample vessels have a capacity in the range of 0.1 to 5 ml, or in the range of 0.3 to 2.5 ml.

7. Device according to claim 1, wherein the sample vessels have a capacity in the range of 0.3 to 2.5 ml.

8. Device according to claim 1, wherein the sample vessels have a depth from 0.1 to 1 mm.

9. Device according to claim 1, wherein the sample vessels have a depth from 0.3 to 0.7 mm.

10. Device according to claim 1, wherein the sample vessels have a capacity of 0.1 to 100 μl.

11. Device according to claim 1, wherein the sample vessels have a capacity of 0.3 to 50 μl.

12. Device according to claim 1, wherein the temperature adjustment unit is in thermal contact with more than one sample vessel.

13. Device according to claim 1, wherein a sensor element is provided for each sample vessel.

14. Device according to claim 1, wherein more than one sample vessel is provided, and are arranged on a circle.

15. Device according to claim 14, wherein the temperature adjustment unit is arranged in the centre of the circle.

16. Device according to claim 1, wherein more than one sample vessels are provided, and are arranged on a line.

17. Device according to claim 16, wherein the temperature adjustment unit consist of at least one flat temperature adjustment element.

18. Device according to claim 16, each sensor element being arranged above one of the sample vessels.

19. Device according to claim 1, wherein the temperature adjustment unit is an infrared radiator.

* * * * *